United States Patent
Weber et al.

[11] Patent Number: 5,804,629
[45] Date of Patent: Sep. 8, 1998

[54] MOLDING MATERIALS BASED ON POLYARYLENE ETHERS

[75] Inventors: Martin Weber, Neustadt; Norbert Guentherberg, Speyer, both of Germany

[73] Assignee: BASF Aktiengesellschaft, Ludwigshafen, Germany

[21] Appl. No.: 258,777

[22] Filed: Jun. 13, 1994

[30] Foreign Application Priority Data

Jun. 24, 1993 [DE] Germany .......................... 43 21 002.3
Mar. 7, 1994 [DE] Germany .......................... 44 07 485.9

[51] Int. Cl.⁶ ............................. C08L 71/00; C08L 81/00
[52] U.S. Cl. .................... 524/424; 524/425; 524/442; 524/456; 525/92 A; 525/92 B; 525/92 E; 525/92 J; 525/205; 525/207; 525/212; 525/390; 525/392; 525/397; 525/534; 525/535; 525/537
[58] Field of Search .................... 525/392, 397, 525/92 A, 92 B, 92 E, 92 J, 205, 207, 212, 390, 534, 537, 535; 524/424, 425, 442, 456

[56] References Cited

U.S. PATENT DOCUMENTS 4,386,176  5/1983  Fukuda et al. .......................... 525/68
5,191,017  3/1993  Eckel et al. ............................. 525/68
5,457,169  10/1995  Weber et al. .......................... 525/534

FOREIGN PATENT DOCUMENTS 044 703   1/1982   European Pat. Off. .
188 904   7/1986   European Pat. Off. .
62084502  10/1985  Japan .

OTHER PUBLICATIONS

JP–A 61174249–English Abstract (Derwent Publications Ltd, AN 86–24381(37).

JP–A 2084502–English Abstract (Derwent Publications Ltd, AN 87–146951(21).

Primary Examiner—Mark L. Warzel
Attorney, Agent, or Firm—Keil & Weinkauf

[57] ABSTRACT

Molding materials comprise polyarylene ethers, copolymers containing units which are derived from aromatic vinyl compounds and cyclic α,β-unsaturated carboxylic anhydrides and carboximides, and furthermore fillers and rubber impact modifiers.

13 Claims, 1 Drawing Sheet

FIG. 1

FIG. 2

MOLDING MATERIALS BASED ON POLYARYLENE ETHERS

The present invention relates to molding material comprising
A) from 1 to 99% by weight of polyarylene ethers,
B) from 1 to 99% by weight of copolymers containing units which are derived from
   $b_1$) aromatic vinyl compounds,
   $b_2$) cyclic α,β-unsaturated dicarboxylic an hydrides and
   $b_3$) cyclic α,β-unsaturated dicarboximides and
C) from 0 to 60% by weight of fibrous or particulate fillers selected from the group consisting of carbon, glass, quartz, Aramid, alkali metal carbonates, alkaline earth metal carbonates, alkali metal silicates and alkaline earth metal silicates,
D) from 0 to 45% by weight of rubber impact modifiers and
E) from 0 to 40% by weight of flameproofing agents, pigments and stabilizers.

The present invention furthermore relates to the use of these molding materials.

Highly heat-resistant thermoplastic materials which may contain copolymers of styrene, maleic anhydride and N-phenylmaleimide were disclosed in JP-A 62084-502.

It is an object of the present invention to provide molding materials which are based on polyarylene ethers, have good processibility and a balanced property spectrum and in particular absorb less water than conventional polyarylene ethers, even on prolonged treatment with water or steam.

We have found that this object is achieved by the molding materials defined at the outset.

Component A

According to the invention, the molding materials contain, as component A, from 1 to 99, preferably 5 to 95, % by weight of polyarylene ethers. In general, however, the molding materials contain 10% by weight or more, for example 15% by weight or more, of polyarylene ethers. The polyarylene ethers are generally present in the molding materials in an amount of up to 90%. The amount of component A in the molding materials is preferably from 20 to 80% by weight.

The polyarylene ethers A may contain both unsubstituted and substituted arylene groups. Preferably, the polyarylene ethers A contain recurring units I

However, the novel molding materials may also contain a mixture of different polyarylene ethers A.

t and q may each be 0, 1, 2 or 3. T, Q and Z independently of one another may be identical or different. They may be a chemical bond or a group selected from —O—, —SO$_2$—, —S—, C=O, —N=N— and S=O. T, Q and Z may furthermore be a group of the formula —R$^a$C=CR$^b$— or —CR$^c$R$^d$—, where R$^a$ and R$^b$ are each hydrogen or C$_1$–C$_{10}$-alkyl and R$^c$ and R$^d$ are each hydrogen, C$_1$–C$_{10}$-alkyl, such as methyl, ethyl, n-propyl, isopropyl, tert-butyl or n-hexyl, C$_1$–C$_{10}$-alkoxy, such as methoxy, ethoxy, n-propoxy, isopropoxy or n-butoxy, or C$_6$–C$_{18}$-aryl, such as phenyl or naphthyl. The groups R$^a$, R$^b$, R$^c$ and R$^d$ may also be substituted by fluorine or chlorine. However, R$^c$ and R$^d$ may furthermore be bonded to form a cycloaliphatic ring. Cycloaliphatic rings of 4 to 7 carbon atoms are preferred. Among these, —CR$^c$R$^d$— is preferably a cyclopentyl or cyclohexyl ring. The cycloaliphatic rings may be substituted by one or more alkyl radicals, preferably methyl. Polyarylene ethers A in which T, Q and Z are each —O—, —SO$_2$—, C=O, a chemical bond or a group of the formula —CR$^c$R$^d$ are preferred. The preferred radicals R$^c$ and R$^d$ include hydrogen and methyl. At least one of the groups T, Q and Z is —SO$_2$— or C=O. Ar and Ar$^1$ are each C$_6$–C$_{18}$-aryl, such as 1,5-naphthyl, 1,6-naphthyl, 2,7-naphthyl, 1,5-anthryl, 9,10-anthryl, 2,6-anthryl, 2,7-anthryl or biphenyl, in particular phenyl. These aryl groups are preferably unsubstituted. However, they may have substituents selected from C$_1$–C$_{10}$-alkyl, such as methyl, ethyl, n-propyl, isopropyl, tert-butyl and n-hexyl, C$_6$–C$_{18}$-aryl, such as phenyl and naphthyl, C$_1$–C$_{10}$-alkoxy, such as methoxy, ethoxy, n-propoxy, isopropoxy and n-butoxy, and halogen. The preferred substituents among these include methyl, phenyl, methoxy and chlorine.

Some suitable recurring units are shown below:

Very particularly preferred molding materials are those which contain, as component A, polyarylene ethers having recurring units ($I_1$), ($I_2$), ($I_{25}$) or ($I_{26}$). These include, for example, molding materials which contain, as component A, polyarylene ethers having from 3 to 97, preferably from 5 to 95, mol % of recurring units ($I_1$) and from 3 to 97, preferably from 5 to 95, mol % of recurring units ($I_2$).

The polyarylene ethers A may also be copolymers or block copolymers in which polyarylene ether segments and segments of other thermoplastic polymers, such as polyamides, polyesters, aromatic polycarbonates, polyestercarbonates, polysiloxanes, polyimides or polyetherimides are present. The number average molecular weight $M_n$ of the blocks or of the grafts in the copolymers are, as a rule, from 1,000 to 30,000 g/mol. The blocks of different structure may be arranged alternately or randomly. The amount of the polyarylene ethers in the copolymers or block copolymers is in general at least 10% by weight and may be up to 97% by weight. Copolymers or block copolymers containing up to 90% by weight of polyarylene ethers are preferred and those containing from 20 to 80% by weight of polyarylene ethers are particularly preferred.

In general, the polyarylene ethers have number average molecular weights $\overline{M}_n$ of from 10,000 to 60,000 g/mol and relative viscosities of from 0.25 to 0.95 dl/g. Depending on the solubility of the polyarylene ethers, the relative viscosities are measured either in 1% strength by weight N-methylpyrrolidone solution, in mixtures of phenol and dichlorobenzene or in 96% strength sulfuric acid, in each case at 20° C. or 25° C.

Polyarylene ethers having recurring units I are known per se and can be prepared by known methods.

They are formed, for example, by condensation of aromatic bishalogen compounds and the alkali metal double salts of aromatic bisphenols. They can also be prepared, for example, by autocondensation of alkali metal salts of aromatic halophenols in the presence of a catalyst. DE-A-38 43 438 discloses, for example, a detailed list of suitable monomers. Suitable processes are described in, inter alia, U.S. Pat. Nos. 3,441,538 and 4,108,837, DE-A1-27 38 962 and EP-A1-361. Polyarylene ethers which contain carbonyl functions are also obtainable by electrophilic (Friedel-Crafts) polycondensation, as described in, inter alia, WO 84/03892. In the electrophilic polycondensation, the carbonyl bridges are formed either by reacting dicarbonyl chlorides or phosgene with aromatics which contain two hydrogen atoms replaceable by electrophilic substituents or by subjecting an aromatic acyl chloride which contains both an acyl chloride group and a substitutable hydrogen atom to polycondensation with itself.

Preferred process conditions for the synthesis of polyarylene ethers are described in, for example, EP-A-113 112 and 135 130. The reaction of the monomers in aprotic solvents, in particular N-methylpyrrolidone, in the presence of an anhydrous alkali metal carbonate, in particular potassium carbonate, is particularly suitable. Reacting the monomers in the melt has also proven advantageous in many cases.

Depending on the synthesis conditions chosen, the polyarylene ethers may have different terminal groups. Among these are those which are inert toward the copolymers B and those which may react with functional groups of the copolymers B, particularly with anhydride groups. The inert terminal groups include halogen, in particular chlorine, alkoxy, especially methoxy or ethoxy, and aryloxy, preferably phenoxy or benzyloxy. Examples of reactive terminal groups are hydroxyl, amino and epoxy.

The synthesis of hydroxyl-terminated polyarylene ethers is possible, for example, by a suitable choice of the stoichiometric ratio of dihydroxy and dihalogen monomers (cf. for example H. G. Elias, "Makromoleküle" 4th Edition, Hüthig & Wepf Verlag, Basle 1981, page 491). Polyarylene ethers having terminal expoxy groups are obtainable, for example, starting from polyarylene ethers containing terminal hydroxyl groups, by reaction with epichlorohydrin (U.S. Pat. No. 4,448,948). Polyarylene ethers having terminal amino groups can be prepared, for example by using p-aminophenol in the polycondensation, as described in J. E. McGrath et al. Polymer 30 (1989), 1552.

In an embodiment, the novel molding materials contain polyarylene ethers A which are essentially free of reactive terminal groups. In another embodiment, the novel molding materials contain mixtures of polyarylene ethers having reactive terminal groups and those having inert terminal groups. In this embodiment, it is particularly preferred if the polyarylene ethers A contain on average about one reactive terminal group and one inert terminal group per chain. If the contents of component A are too high, above about 50% by weight of polyarylene ethers having two reactive terminal groups per chain, insoluble reaction products with component B may form.

Component B

The novel molding materials contain, as component B, from 1 to 99, preferably from 5 to 95, % by weight of copolymers. In general, however, the molding materials contain 90% by weight or less of these copolymers. The copolymers are in general present in the molding materials in an amount of 10% by weight or more, for example 15% by weight or more. The amount of component B in the molding materials is preferably from 20 to 80% by weight.

The copolymers B contain units $b_1$ which are derived from aromatic vinyl compounds. The amount of units $b_1$ is preferably from 20 to 90, in particular from 40 to 80, very particularly preferably from 50 to 75, mol %.

Particularly suitable aromatic vinyl compounds are styrene and styrene derivatives. The suitable styrene derivatives include α-methylstyrene and styrene derivatives substituted in the aromatic nucleus, such as vinyltoluene, tert-butylstyrene and chlorostyrene. Mixtures of different aromatic vinyl compounds can of course also be used. Styrene is very preferably used.

In addition to the units $b_1$, the copolymers B contain units which are derived from cyclic α,β-unsaturated dicarboxylic anhydrides $b_2$, the amount of which is preferably from 1 to 50 mol %. Copolymers B containing substantially less than 1 mol %, for example those containing less than 0.5 mol %, of units $b_1$ are in general not sufficiently heat-resistant. Those containing substantially more than 50 mol % cannot in general be readily processed since they are too brittle.

The copolymers B preferably contain from 1 to 35, in particular from 1 to 25, mol % of $b_2$.

The preferred cyclic α,β-unsaturated dicarboxylic anhydrides include those of 2 to 20 carbon atoms. The double bond may be either exocyclic or endocyclic. Among these, maleic anhydride, methylmaleic, anhydride and itaconic anhydride are particularly preferred. Mixtures of different dicarboxylic anhydrides may also be used.

The copolymers B furthermore contain units $b_3$ which are derived from cyclic α,β-unsaturated dicarboximides. These are generally present in the copolymers B in amounts of from 9 to 50 mol %. Preferred copolymers B contain from 15 to 50, in particular from 24 to 49, mol % of $b_3$.

In general, the cyclic α,β-unsaturated dicarboximides correspond to the abovementioned dicarboxylic anhydrides $b_2$. The substituent on the nitrogen is, as a rule, $C_1$–$C_{20}$-alkyl, $C_4$–$C_{20}$-cycloalkyl, $C_1$–$C_{10}$-alkyl-$C_6$–$C_{18}$-aryl or $C_6$–$C_{18}$-aryl.

The alkyl radicals may be either linear or branched and may be interrupted by one or more oxygen atom, the latter not being bonded directly to the nitrogen atoms and not being bonded directly to another oxygen atom. These alkyl radicals include methyl, ethyl, n-propyl, isopropyl, n-butyl, isobutyl, tert-butyl, n-hexyl, n-decyl and n-dodecyl. The cycloalkyl radials may be unsubstituted or substituted. Examples of suitable substituents are alkyl, such as methyl or ethyl. Examples of cycloalkyl radicals are cyclobutyl, cyclopentyl, cyclohexyl and p-methylcyclohexyl. The alkyl group of the alkylaryl radicals may be either linear or branched, and the alkylaryl radicals may also have substituents. Examples of such substituents are alkyl, such as methyl or ethyl, and halogen, such as chlorine or bromine. Examples of suitable alkylaryl radicals are benzyl, ethylphenyl and p-chlorobenzyl. The aryl radicals may furthermore be substituted or unsubstituted, for example alkyl groups, such as methyl or ethyl, or halogen atoms, such as chlorine or bromine, being suitable substituents. The preferred aryl radicals include phenyl and naphthyl. Cyclohexyl and phenyl are very particularly preferred radicals.

The copolymers B may furthermore contain from 0 to 30, preferably from 5 to 25, mol % of units $b_4$ which are derived from further compounds capable of undergoing free radical polymerization.

Examples of these are acrylic acid and acrylic acid derivatives, such as methacrylic acid, acrylonitrile, methacrylonitrile, alkyl acrylates, such as ethyl acrylate, or ethyl methacrylate.

The copolymers B contain the units $b_1$ to $b_4$ in a random distribution. As a rule, the copolymers B have weight average molecular weights MW of from 30,000 to 500,000, preferably from 50,000 to 250,000, in particular from 70,000 to 200,000, g/mol.

The copolymers B can be prepared, for example, by subjecting the corresponding monomers to free radical polymerization. The reaction can be carried out by suspension, emulsion, solution or mass polymerization, the last-mentioned method being preferred. The free radical reaction can be initiated in general by the conventional methods, such as by means of light or, preferably, with free radical initiators, such as peroxides, eg. benzoyl peroxide.

As described in, for example, U.S. Pat. No. 4,404,322, the copolymers B can also be prepared by first reacting the components $b_1$, $b_2$ and, if required, $b_4$ with one another in a free radical reaction and then converting some of the anhydride groups present in the reaction product into imide groups with corresponding primary amines or ammonia. The primary amines include both aliphatic and aromatic amines. Examples of suitable primary amines are $C_1$–$C_{20}$-alkylamines, $C_4$–$C_{20}$-cycloalkylamines, amino-$C_1$–$C_{10}$-alkylenearyls and $C_6$–$C_{18}$-arylamines. The alkyl radicals of the primary amines may be either linear or branched and may be interrupted by one or more oxygen atoms, the latter not being bonded directly to the nitrogen atoms and not being bonded directly to another oxygen atom. These alkyl radicals include methyl, ethyl, n-propyl, isopropyl, n-butyl, isobutyl, tert-butyl, n-hexyl, n-decyl and n-dodecyl. The cycloalkylamines may be unsubstituted or substituted. Suitable substituents are, for example, alkyl, such as methyl or ethyl. Examples of cycloalkyl radicals are cyclobutyl, cyclopentyl, cyclohexyl and p-methylcyclohexyl. The alkyl group of the aminoalkylenearyls may be either linear or branched, and the aryl group may also carry substituents. Examples of such substituents are alkyl, such as methyl or ethyl, and halogen, such as chlorine or bromine. Examples of suitable aminoalkylaryls are aminophenylmethane, 1-amino-2-phenylethane and 1-amino-2-(p-chlorophenyl)-ethane. The arylamines, too, may be substituted or unsubstituted, for example alkyl groups, such as methyl or ethyl, or halogen atoms, such as chlorine or bromine, being suitable substituents. The preferred arylamines include aniline and naphthylamines, eg. 2-aminonaphthalene. Cyclohexylamine and aniline are very particularly preferred.

This reaction is carried out, as a rule, in the presence of a tertiary amine, such as a trialkylamine or a dialkylarylamine, eg. triethylamine or N,N-diethylaniline, as a catalyst, at from 80° to 350° C.

In this variant of the method of preparation, preferably from 50 to 75 mol % of aromatic vinyl compound are reacted with from 25 to 50 mol % of cyclic α,β-unsaturated dicarboxylic anhydrides and the product is then treated with ammonia or primary amines ($b_5$), the molar ratio of components $b_2$:$b_5$ being 0.9–1.1.

Component C

In addition to the components A and B, the novel molding materials may contain up to 60, preferably from 0 to 55, % by weight of fibrous or particulate fillers or of a mixture thereof. These may be selected from the group consisting of carbon, glass, quartz, Aramid, alkali metal carbonates, alkaline earth metal carbonates, alkali metal silicates and alkaline earth metal silicates.

Preferred fibrous fillers or reinforcing materials are carbon fibers, potassium titanate whiskers, Aramid fibers and particularly preferably glass fibers. When glass fibers are used, they may be provided with a size and an adhesion promoter to improve the compatibility with the matrix material. In general, the carbon and glass fibers used have a diameter of from 6 to 20 μm.

The glass fibers may be incorporated in the form of both short glass fibers and rovings. In the finished injection molded part, the average length of glass fibers is preferably from 0.08 to 0.5 mm.

Carbon fibers or glass fibers can also be used in the form of woven glass fabrics, glass mate or glass rovings.

Suitable particulate fillers are amorphous silica, magnesium carbonate (chalk), powdered quartz, glass beads and in particular calcium silicates, such as wollastonite and kaolin (in particular calcined kaolin).

Preferred combinations of fillers are, for example, 20% by weight of glass fibers with 15% by weight of wollastonite and 15% by weight of glass fibers with 15% by weight of wollastonite. A further preferred combination contains, for example, 20% by weight of carbon fibers and 20% by weight of wollastonite.

Component D

The novel molding materials may furthermore contain from 0 to 45, preferably from 0 to 30, % by weight of rubber impact modifiers. Those which are capable of toughening polyarylene ethers and/or copolymers B are particularly suitable.

Examples of rubbers which toughen the blends are EP or EPDM rubbers which have been grafted with functional groups. Examples of suitable grafting reagents are maleic anhydride, itaconic acid, acrylic acid, glycidyl acrylate and glycidyl methacrylate.

These monomers can be grafted onto the polymer in the melt or in solution, in the presence or absence of a free radical initiator, such as cumyl hydroperoxide.

Further examples are copolymers of α-olefins. The α-olefins are usually monomers of 2 to 8 carbon atoms, preferably ethylene and propylene. Alkyl acrylates or alkyl methacrylates which are derived from alcohols of 1 to 8 carbon atoms, preferably ethanol, butanol or ethylhexanol, as well as reactive comonomers, such as acrylic acid, methacrylic acid, maleic acid, maleic anhydride or glycidyl (meth)acrylate, and furthermore vinyl esters, in particular vinyl acetate, have proven suitable comonomers. Mixtures of different comonomers may also be used. Copolymers of ethylene with ethyl or butyl acrylate and acrylic acid and/or maleic anhydride have proven particularly useful.

The copolymers can be prepared in a high pressure process at from 400 to 4,500 bar or by grafting the comonomers onto the poly-α-olefin. The amount of the α-olefin in the copolymer is in general from 99.95 to 55% by weight.

A further group of suitable elastomers comprises core/shell graft rubbers. These are graft rubbers prepared in emulsion consisting of at least one rigid and one flexible component. A rigid component is usually understood as meaning a polymer having a glass transition temperature of at least 25° C., while a flexible component is understood as meaning a polymer having a glass transition temperature of not more than 0° C. These products have a structure comprising a core and at least one shell, the structure resulting from the sequence of addition of the monomers. The flexible components are derived in general from butadiene, isoprene, alkyl acrylates, alkyl methacrylates or siloxanes and, if required, further comonomers. Suitable siloxane cores can be prepared, for example, starting from cyclic oligomeric octamethyltetrasiloxane or tetravinyltetramethyltetrasiloxane. These can be reacted, for example, with γ-mercaptopropylmethyldimethoxysilane in a cationic polymerization with ring cleavage, preferably in the presence of sulfonic acids, to give the flexible siloxane cores. The siloxanes may also be crosslinked by, for example, carrying out the polymerization reaction in the presence of silanes having hydrolysable groups, such as halogen or alkoxy, for example tetraethoxysilane, methyltrimethoxysilane or phenyltrimethoxysilane. Examples of suitable comonomers here are styrene, acrylonitrile and crosslinking or graftlinking monomers having more than one polymerizable double bond, such as diallyl phthalate, divinylbenzene, butanediol diacrylate or triallyl (iso)cyanurate. The rigid components are derived in general from styrene, α-methylstyrene and copolymers thereof, preferred comonomers here being acrylonitrile, methacrylonitrile and methyl methacrylate.

Preferred core/shell graft rubbers contain a flexible core and a rigid shell or a rigid core, a first flexible shell and at least one further rigid shell. The functional groups, such as carbonyl, carboxyl, anhydride, amido, imido, ester, amino, hydroxyl, epoxy, oxazolyl, urethane, urea, lactam or halobenzyl groups, are preferably incorporated by the addition of suitable functionalized monomers in the polymerization of the final shell. Suitable functionalized monomers are, for example, maleic acid, maleic anhydride, mono- or diesters of maleic acid, tert-butyl (meth)acrylate, acrylic acid, glycidyl (meth)-acrylate and vinyloxazoline. The amount of monomers having functional groups is in general from 0.1 to 25, preferably from 0.25 to 15, % by weight, based on the total weight of the core/shell graft rubber. The weight ratio of flexible to rigid components is in general from 1:9 to 9:1, preferably from 3:7 to 8:2.

Such rubbers are known per se and are described in, for example, EP-A 208 187.

A further group of suitable impact modifiers comprises thermoplastic polyester elastomers. Polyester elastomers are understood as meaning segmented copolyetheresters which contain long-chain segments derived, as a rule, from poly (alkylene) ether glycols and short-chain segments derived from low molecular weight diols and dicarboxylic acids. Such products are known per se and are described in the literature, for example in U.S. Pat. No. 3,651,014. Corresponding-products are also commercially available under the names Hytrel® (Du Pont), Arnitel® (Akzo) and Pelprene® (Toyobo Co. Ltd.).

Mixtures of different rubbers can of course also be used.
Component E

In addition to the components A to D described, the novel molding materials may furthermore contain from 0 to 40% by weight of flameproofing agents, pigments and stabilizers.

The novel molding materials can be prepared by conventional processes, for example extrusion.

The novel molding materials can be prepared, for example, by mixing the starting components in a conventional mixing apparatus, such as a screw extruder, preferably a twin-screw extruder, a Brabender mill or a Banbury mill, or a kneader and then extruding the mixture. After the extrusion, the extrudate is cooled and comminuted.

The order in which the components are mixed may be varied; for example, two or, if desired, three components may be premixed or all components may be mixed together.

Thorough mixing is advantageous for obtaining a very homogeneous molding material. In general, average mixing times of from 0.2 to 30 minutes at from 250° to 400° C., preferably from 280° to 380° C., are required for this purpose. After extrusion, the extrudate is generally cooled and comminuted.

The novel molding materials can be processed by a thermoplastic method. They have good rigidity in conjunction with good flow and low water absorption. Owing to the low water absorption and the high heat distortion resistance, the novel molding materials are particularly suitable for the production of household appliances or apparatuses for the medical sector. However, they can also be used in the electrical and electronics area. In addition to moldings, it is also possible to produce films or fibers from the novel molding materials.

In an embodiment, the novel molding materials contain, as component A, polyarylene ethers having reactive terminal groups. Under the stated processing conditions, these react with the functional groups, especially the anhydride groups, of the copolymers B. If no reinforcing agents are added to these reaction products, they may be used as compatibilizers for blends based on polyarylene ethers. The compatibilizers are preferably prepared in the melt. However, they may also be prepared by reacting components A and B with one another in solution. Polar aprotic liquids, such as dimethylformamide, dimethylacetamide or N-methylpyrrolidone, or mixtures of polar aprotic liquids with other organic solvents, including in particular chlorobenzene, o-dichlorobenzene, tetrahydrofuran, dichloromethane or chloroform, are examples of suitable solvents. Depending on the reactive terminal groups, the reaction of components A and B is carried out in general at from 20° to 200° C. The duration of the reaction is as a rule from 30 minutes to 24 hours. In general, the polymers A and B may each be present in concentrations of from 1 to 30% by weight in the solutions, highly concentrated solutions, especially from 10 to 25% by weight solutions, being preferred. The compatibilizer may be isolated, for example, by precipitation from the solution with precipitating agent, such as water or ethanol. The novel compatibilizers have a plurality of phases, which is evident, for example, by a plurality of glass transition temperatures. The phase separation can also be demonstrated by means of transmission electron micrographs. Consequently, the compatibilizers may accumulate at the phase boundary in blends and have a compatibilizing effect.

EXAMPLES

Testing of the performance characteristics

The modulus of elasticity was determined using dumbbells in a tensile test according to DIN 53,455. The flow was determined according to DIN 53,735 at 300° C. and 320° C. and under a load of 21.6 kg.

The water absorption of the samples was determined using dumbbells which had been stored in boiling water for 2 days.

The heat distortion resistance of the samples was determined by means of the Vicat softening temperature. The Vicat softening temperature was measured using standard small bars, according to DIN 53,460, with a force of 49.05N and a temperature increase of 50K per hour.

The viscosity number (VN) of the components was determined either in N-methylpyrrolidone or in a mixture of phenol and 1,2-dichloromethane.

The softening points (Tg) of the components and of the compatibilizers were determined by means of differential thermoanalysis (DSC) at a heating rate of 10K/min.

Transmission electron micrographs of ultrathin sections were recorded.

The terminal hydroxyl (OH) group concentration of the components was determined by means of potentiometric titration with methanolic potassium hydroxide solution. The terminal amino ($NH_2$) group concentration was measured by means of potentiometric titration with trifluoromethanesulfonic acid. The amount of terminal chlorine (Cl) groups was determined via the total content of organically bound chlorine in the samples.

Component $A_1$

Polyarylene ether obtained from 4,4'-dihydroxydiphenyl sulfone and 4,4'-dichlorodiphenyl sulfone (polyether sulfone: viscosity number (VN)=56 ml/g, measured in 1% strength by weight solution in a 1:1 mixture of phenol and 1,2-dichlorobenzene; e.g. commercial product Ultrason® E 2010, BASF), having a Tg of 225° C. and a ratio of terminal Cl groups to terminal $OCH_3$ groups of 60:40.

Component $A_2$

Polyarylene ether obtained from bisphenol A and 4,4'-dichlorodiphenyl sulfone (polysulfone: VN=64 ml/g, measured in 1% strength by weight solution in a 1:1 mixture of phenol and 1,2-dichlorobenzene; e.g. commercial product Ultrason® S 2010, BASF), having a Tg of 186° C. and a ratio of terminal Cl groups to terminal $OCH_3$ groups of 60:40.

Component $A_3$

Polyarylene ether obtained from 4,4'-di-4-hydroxyphenyl sulfone and 4,4'-dichlorodiphenyl sulfone, characterized by a VN of 54.7 ml/g (measured in 1% strength by weight solution in N-methylpyrrolidone at 25° C.), a Tg of 218° C. and a ratio of terminal Cl groups to terminal OH groups of 53:47.

Component $A_4$

Polyarylene ether obtained from 4,4'-di-4-hydroxyphenyl sulfone and 4,4'-dichlorodiphenyl sulfone, characterized by a VN of 46.2 ml/g (measured in 1% strength by weight solution in N-methylpyrrolidone at 25° C.), a Tg of 217° C. and a ratio of terminal Cl groups to terminal OH groups of 3:97.

Component $A_5$

Polyarylene ether obtained from 4,4'-di-4-hydroxyphenyl sulfone, 4-Aminophenol and 4,4'-dichlorodiphenyl sulfone, characterized by a VN of 31.5 ml/g (measured in 1% strength by weight solution in N-methylpyrrolidone at 25° C.), a Tg of 214° C. and a ratio of terminal Cl groups to terminal $NH_2$ groups to terminal OH groups of 50:43:7.

Component $A_6$

Polyarylene ether obtained from 4,4'-di-4-hydroxyphenyl sulfone, 4-aminophenol and 4,4'-dichlorodiphenyl sulfone, characterized by a VN of 18.9 ml/g (measured in 1% strength by weight solution in N-methylpyrrolidone at 25° C.), a Tg of 210° C. and a ratio of terminal Cl groups to terminal $NH_2$ groups to terminal OH groups of 2:73:25.

Component $B_1$

Terpolymer consisting of 58 mol % of styrene, 3 mol % of maleic anhydride and 39 mol % of N-phenylmaleimide.

Component $B_2$

Terpolymer consisting of 58 mol % of styrene, 8 mol % of maleic anhydride and 34 mol % of N-phenylmaleimide.

Component $C_1$

Glass rovings which had a thickness of 10 μm, consisted of E glass and had been treated with a polyurethane size. After incorporation, the average lengths of the glass fibers were from about 0.1 to 0.5 mm.

Examples 1 to 12 and Comparative examples V1 to V3

The components were mixed in a twin-screw extruder at melt temperature of from 300° to 350° C. The melt was passed through a water bath and granulated.

The dried granules were processed at from 310° to 340° C. to give standard small bars and dumbells.

The compositions of the molding materials and the results of the testing of the performance characteristics are shown in Tables 1 and 2.

Figure 1:
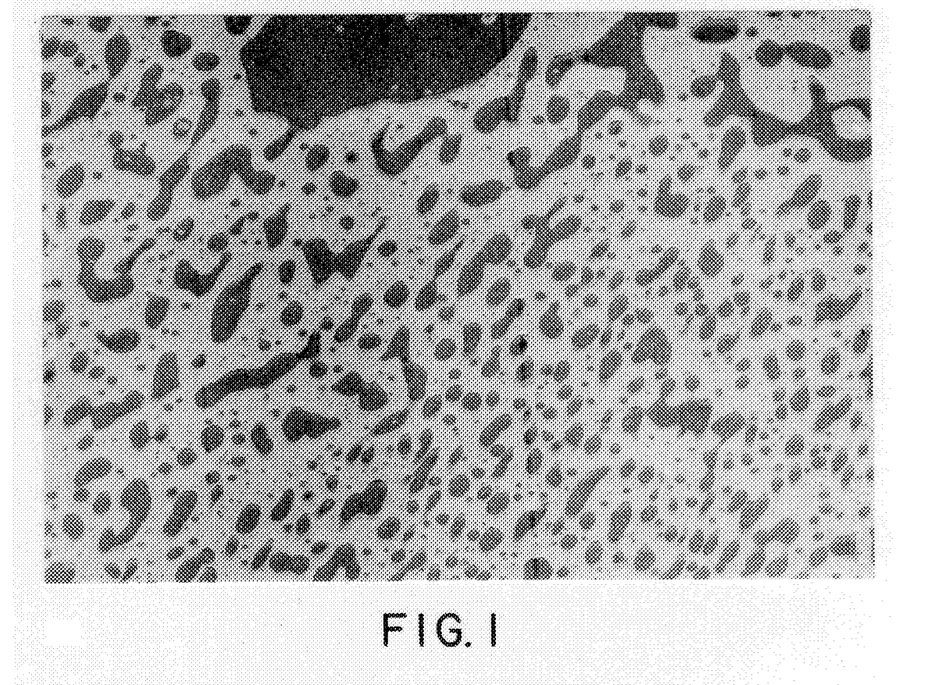

Ultrathin sections of the molding material obtained in Example 4 were prepared and were investigated by electron microscopy at a magnification of 7000:1 (cf. FIG. 1/2).

TABLE 1

Unreinforced molding materials

| Component [% by weight] | 1 | 2 | 3 | 4 | V1 | 5 | 6 | 7 | 8 | V2 |
|---|---|---|---|---|---|---|---|---|---|---|
| $A_1$ | 80 | 60 | 80 | 60 | 100 | — | — | — | — | — |
| $A_2$ | — | — | — | — | — | 80 | 60 | 80 | 60 | 100 |
| $B_1$ | 20 | 40 | — | — | — | 20 | 40 | — | — | — |
| $B_2$ | — | — | 20 | 40 | — | — | — | 20 | 40 | — |
| Properties | | | | | | | | | | |
| Modulus of elasticity [N/mm²] | 2950 | 3300 | 2900 | 3250 | 2750 | 2900 | 3200 | 2870 | 3150 | 2700 |
| MVI*¹ [ml/10'] | 142 | 240 | 120 | 218 | 53 | — | — | — | — | — |
| MVI*² [ml/10'] | — | — | — | — | — | 130 | 230 | 115 | 210 | 62 |
| Vicat B [°C.] | 217 | 216 | 216 | 214 | 220 | 188 | 190 | 185 | 189 | 186 |
| Water absorption [%] | 1.4 | 1.2 | 1.5 | 1.2 | 1.9 | 0.6 | 0.5 | 0.7 | 0.5 | 1.0 |

MVI*¹: Measuring temperature 320° C.
MVI*²: Measuring temperature 300° C.
V1, V2: Comparative Experiment

TABLE 2

Reinforced molding materials

| Component [% by weight] | 9 | 10 | 11 | 12 | V3 |
|---|---|---|---|---|---|
| $A_1$ | 63 | 49 | 63 | 49 | 70 |
| $B_1$ | 7 | 21 | — | — | — |
| $B_2$ | — | — | 7 | 21 | — |
| $C_1$ | 30 | 30 | 30 | 30 | 30 |
| Properties | | | | | |
| Modulus of elasticity [N/mm²] | 11500 | 13000 | 11300 | 12600 | 9600 |
| MVI*¹ [ml/10'] | 39 | 72 | 38 | 66 | 21 |
| Vicat B [°C.] | 217 | 215 | 216 | 214 | 221 |
| Water absorption [%] | 1.0 | 0.8 | 0.9 | 0.7 | 1.3 |

MVI*¹: Measuring temperature 320° C.
V3: Comparative Experiment

Example 13 to 17 and Comparative Examples V4 to V5
Preparation of compatibilizers Example 13

10 g of $A_3$ were added, while stirring, to a solution of 20 g of $B_1$ in 150 ml of N-methylpyrrolidone under an inert gas atmosphere at 80° C. After the end of the addition, stirring was continued for a further 2 hours at 80° C. The reaction product was precipitated by means of water, isolated, and dried at 120° C. under reduced pressure.

Comparative Example V4

10 g of $A_4$ were added, while stirring, to a solution of 20 g of $B_1$ in 150 ml of N-methylpyrrolidone under an inert gas atmosphere at 80° C. Only a few minutes after the addition of $A_4$, a precipitate formed. As a result of the high content of reactive terminal groups in the polyarylene ethers, microgel formation and crosslinking occurred. The product was therefore unsuitable as a compatibilizer.

Example 14

10 g of $A_5$ were added, while stirring, to a solution of 20 g of $B_1$ in 150 ml of N-methylpyrrolidone under an inert gas atmosphere at 0° C. After the end of the addition of $A_5$, stirring was continued for another 30 minutes at 0° C. Heating was then carried out for 8 hours at 190° C. After the reaction mixture had cooled, the product was worked up as stated under Example 13.

Comparative Example V5

10 g of $A_6$ were added, while stirring, to a solution of 20 g of $B_1$ in 150 ml of N-methylpyrrolidone under an inert gas atmosphere at 0° C. Only a few minutes after the addition of $A_6$, a precipitate formed. As a result of the high content of reactive terminal groups in the polyarylene ethers, microgel formation and crosslinking occurred. The product was therefore unsuitable as a compatibilizer.

Example 15

Example 14 was repeated, except that components $B_2$ and $A_5$ were used instead of the components stated there.

Example 16

Figure 2:
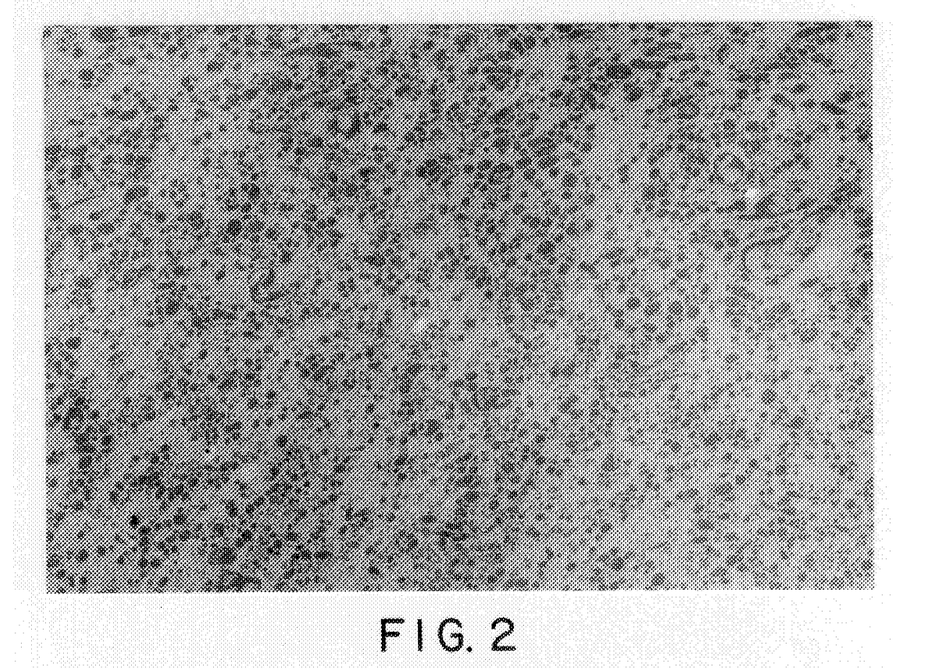

A mixture of 30 g of $B_1$ and 20 g of $A_5$ was thoroughly mixed in a Haake kneader at 320° C. for 5 minutes, and the resulting molding material was discharged and comminuted. Ultrathin sections of the molding materials obtained were prepared and were investigated by electron microscopy (cf. FIG. 2/2).

EXAMPLE 17

A mixture of 3 kg of $B_1$ and 2 kg of $A_5$ was mixed in a twin-screw extruder (ZKS 30 from Werner & Pfleiderer) at 340° C. The extrudate was cooled in a water bath and granulated.

The results of the testing of the performance characteristics are shown in Table 3.

| Example No. | 13 | 14 | 15 | 16 | 17 |
|---|---|---|---|---|---|
| VN [ml/g] | 62 | 41 | 44 | 43 | 41 |
| Tg [°C.] | 207/218 | 207/214 | 205/214 | 207/214 | 207/214 |
| Extractables $B_1$ or $B_2$ [%] | 12 | 6 | 4 | 6 | 8 |

Table 3 shows that the reaction between polyarylene ethers A which contain reactive terminal groups and copolymers B takes place with high yields and that in all cases products having a plurality of phases are obtained.

We claim:

1. A molding material comprising

A) from 1 to 99% by weight of polyarylene ethers containing recurring units I where t and q are each an integer 0, 1, 2 or 3, T, O and Z are each a chemical bond or a group selected from —O—, —S—, —SO$_2$—, S=O, C=O, —N=N—, —R$^a$C=CR$^b$— OR —CR$^c$R$^d$—, with the proviso that the polymer backbone contains at least one of the groups —SO$^2$— or CO and Z cannot be —O— when t and g are each 0, R$^a$ and R$^b$ are each hydrogen or C$_1$–C$_{10}$-alkyl, R$^c$ and R$^d$ are each hydrogen, C$_1$–C$_{10}$-alkyl, C$_1$–C$_{10}$-alkoxy or C$_6$–C$_{18}$-aryl, where the abovementioned R$^a$, R$^b$, R$^c$ and R$^d$ groups may each be substituted by fluorine or chlorine, and Ar and Ar$^1$ are each C$_6$–C$_{18}$-aryl which may have substituents selected from C$_1$–C$_{10}$-alkyl, C$_6$–C$_{18}$-aryl, C$_1$–C$_{10}$-alkoxy or halogen, B) from 1 to 99% by weight of copolymers containing units which are derived from b$_1$) from 20 to 90 mol % of the aromatic vinyl compounds, b$_2$) from 1 to 50 mol % of the cyclic α,β-unsaturated dicarboxylic anhydrides, b$_3$) from 9 to 50 mol % of the cyclic α,β-unsaturated dicarboximides and b$_4$) from 0 to 30 mol % of further compounds capable of undergoing free radical polymerization and

C) from 0 to 60% by weight of fibrous or particulate fillers selected from the group consisting of carbon, glass, quartz, Aramid, alkali metal carbonates, alkaline earth metal carbonates, alkali metal silicates and alkaline earth metal silicates, D) from 0 to 40% by weight of polyester elastomers and E) from 0 to 40% by weight of flameproofing agents, pigments and stabilizers.

2. A molding material as defined in claim 1, in which the polyarylene ethers contain a$_1$) from 3 to 97 mol % of recurring units II and a$_2$) from 3 to 97 mol % of recurring units III 3. A molding material as defined in claim 1, in which the polyarylene ethers A contain reactive terminal groups.

4. A molding material as defined in claim 1, in which the reactive terminal groups are hydroxyl, amino or epoxy groups.

5. A molding material as defined in claim 1, in which the copolymers B contain units which are derived from b$_1$) styrene, b$_2$) maleic anhydride and b$_3$) N-phenylmaleimide.

6. A molding material as defined in claim 1, in which the copolymers B are obtained by reacting the aromatic vinyl compounds $b_1$ and the cyclic α,β-unsaturated dicarboxylic anhydrides $b_2$ with ammonia or primary amines.

7. A molding material as defined in claim 6, in which the copolymers B are obtained by reacting $b_1$) from 50 to 75 mol % of aromatic vinyl compounds and $b_2$) from 25 to 50 mol % of cyclic α,β-unsaturated dicarboxylic anhydrides in a first stage and thereafter reacting the product thus obtained, with $b_5$) ammonia or primary amines, the molar ratio of the components $b_2$:$b_5$ being 0.9–1.1 in a second stage.

8. A molding, film or shaped article produced using the molding material as defined in claim 1.

9. A household appliance or medical apparatus produced using a molding material as defined in claim 1.

10. A compatibilizer obtained using a molding material as defined in claim 3.

11. A process for the preparation of a compatibilizer, wherein

A) from 1 to 99% by weight of polyarylene ethers having reactive terminal groups are reacted with B) from 1 to 99% by weight of copolymers containing units which are derived from $b_1$) aromatic vinyl compounds, $b_2$) cyclic α,β-unsaturated dicarboxylic anhydrides and $b_3$) cyclic α,β-unsaturated dicarboximides.

12. A process of claim 11, wherein the reaction is carried out at from 250° to 400° C. in the melt.

13. A molding material as defined in claim 1 containing from 10 to 90% by weight of component A and from 10 to 90% by weight of component B.

* * * * *

UNITED STATES PATENT AND TRADEMARK OFFICE
CERTIFICATE OF CORRECTION

PATENT NO.: 5,804,629

DATED: September 8, 1998

INVENTOR(S): WEBER et al.

It is certified that error appears in the above-identified patent and that said Letters Patent is hereby corrected as shown below:

Col. 16, claim 1, line 10, "O" should be --Q--.

Col. 18, claim 12, line 12, "A" should be --The--.

Signed and Sealed this

First Day of December, 1998

Attest:

BRUCE LEHMAN

Attesting Officer

Commissioner of Patents and Trademarks